Sept. 14, 1937.    A. F. SPITZGLASS ET AL    2,093,254
METER
Filed Sept. 18, 1933    4 Sheets-Sheet 1
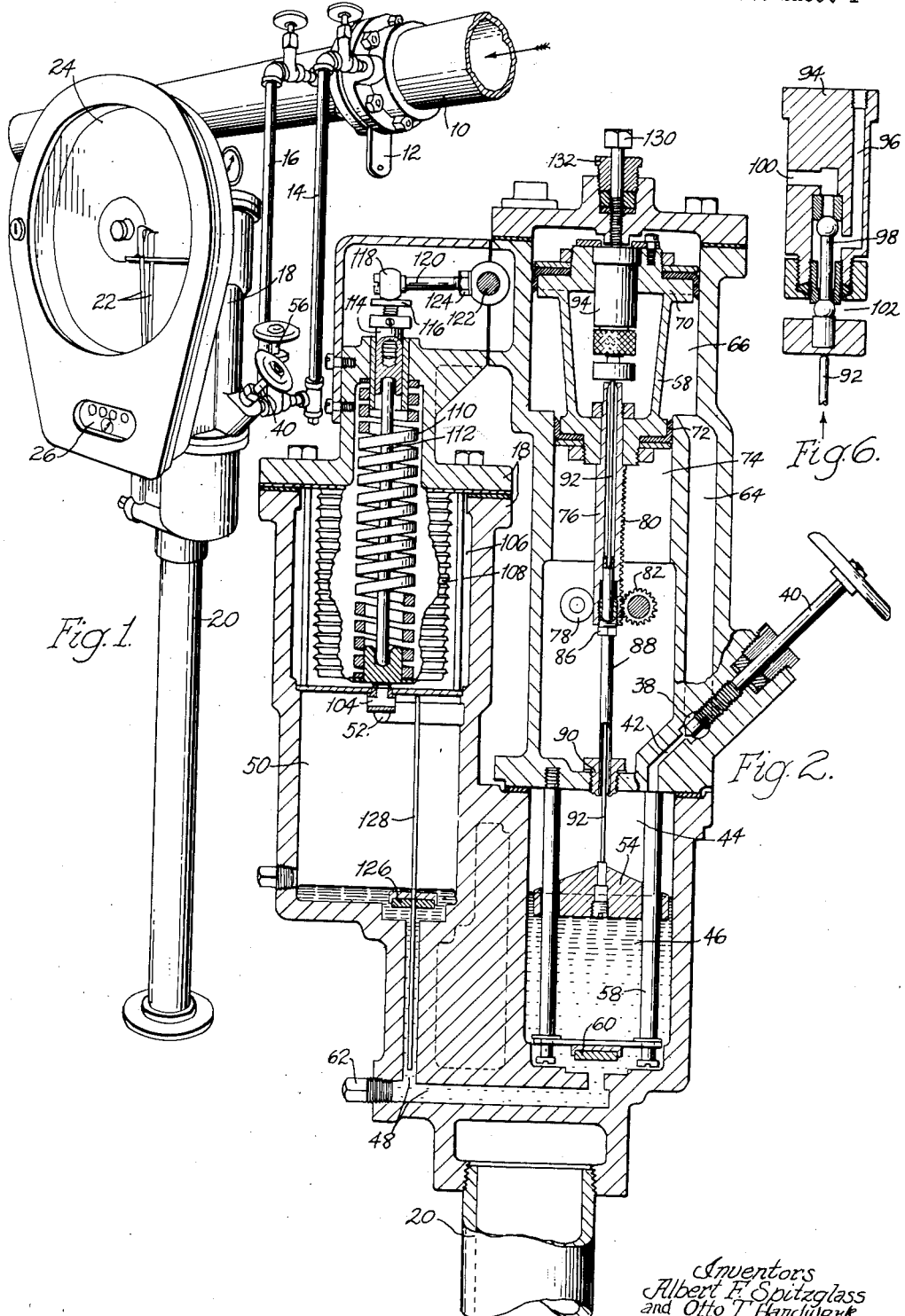
Inventors
Albert F. Spitzglass
and Otto T. Handwerk
by M. W. McConkey
Attorney Sept. 14, 1937.   A. F. SPITZGLASS ET AL   2,093,254
METER
Filed Sept. 18, 1933   4 Sheets-Sheet 3

Inventors
Albert F. Spitzglass
and Otto T. Handwerk
By M. W. McConkey
Attorney

Patented Sept. 14, 1937

2,093,254

UNITED STATES PATENT OFFICE 2,093,254

METER

Albert F. Spitzglass and Otto T. Handwerk, Chicago, Ill., assignors to Republic Flow Meters Company, Chicago, Ill., a corporation of Illinois Application September 18, 1933, Serial No. 689,859

4 Claims. (Cl. 73—205)

This invention relates to mechanism suitable for use in meters and the like, and is illustrated as embodied in a meter indicating the product of two variable quantities, for example in order automatically to correct the reading of a flow meter for variations in density of the steam or other fluid whose flow is being measured.

In metering the flow of steam and other fluids, it is customary to measure the differential in pressure across an orifice or the like inserted in the pipe through which the fluid is flowing, the square root of the differential in the pressures on opposite sides of the orifice being inversely proportional to the rate of flow. It is desirable, however, to correct this reading for variations in density of the fluid, e. g. by correcting according to the square root of the fluid pressure. This has been accomplished in various ways heretofore; for example an electrical apparatus for making this correction is shown in Patent No. 1,847,105 granted on March 1, 1932, to Albert F. Spitzglass.

One object of the present invention is to provide a simple mechanical device for automatically correcting the reading of a meter of this type, or for performing other operations in meters and other mechanisms which involve multiplying two variable quantities to secure a resulting product which varies with the variations of both of them.

In the illustrated meter there are two parts moved according to the square root of the pressure and according to the square root of the differential in pressure, and the indicating means includes novel automatic multiplying means connected to and actuated by both of these parts to give the desired corrected figure. Various features of novelty relate to the means for moving these parts according to the square roots of their respective quantities, to an arrangement by which the pressure quantity is measured as an absolute pressure instead of from atmospheric pressure as zero, and particularly to facilitating such a measurement by providing means for correcting for variations in the atmospheric (or barometric) pressure.

There is also substantial novelty in the connections for multiplying the two variables, and in an indicating arrangement by which two pens or pointers or other indicators are independently moved about the same axis to show the product (or corrected result) and also to show independently a function of one of the quantities being measured, for example the fluid pressure.

Another feature of the invention relates to the use of a fluid motor or other power device, controlled by one of the measuring means and giving a powerful but sensitively-controlled operation of the above-described mechanism. In the illustrated arrangement the motor is operated by the pressure of the fluid whose flow is being measured.

The above and other objects and features of the invention, including various novel combinations of parts and desirable particular constructions, will be apparent from the following description of the illustrative embodiment shown in the accompanying drawings, in which:

Figure 1 is a perspective view of one form of meter, utilizing as indicators a pair of pens drawing lines on a circular chart;

Figure 2 is a vertical sectional view through the meter, showing the power motor and the means for measuring the fluid pressure and the differential pressure;

Figure 6 is a detail view showing one form of valve mechanism for the power device.

Figure 3:
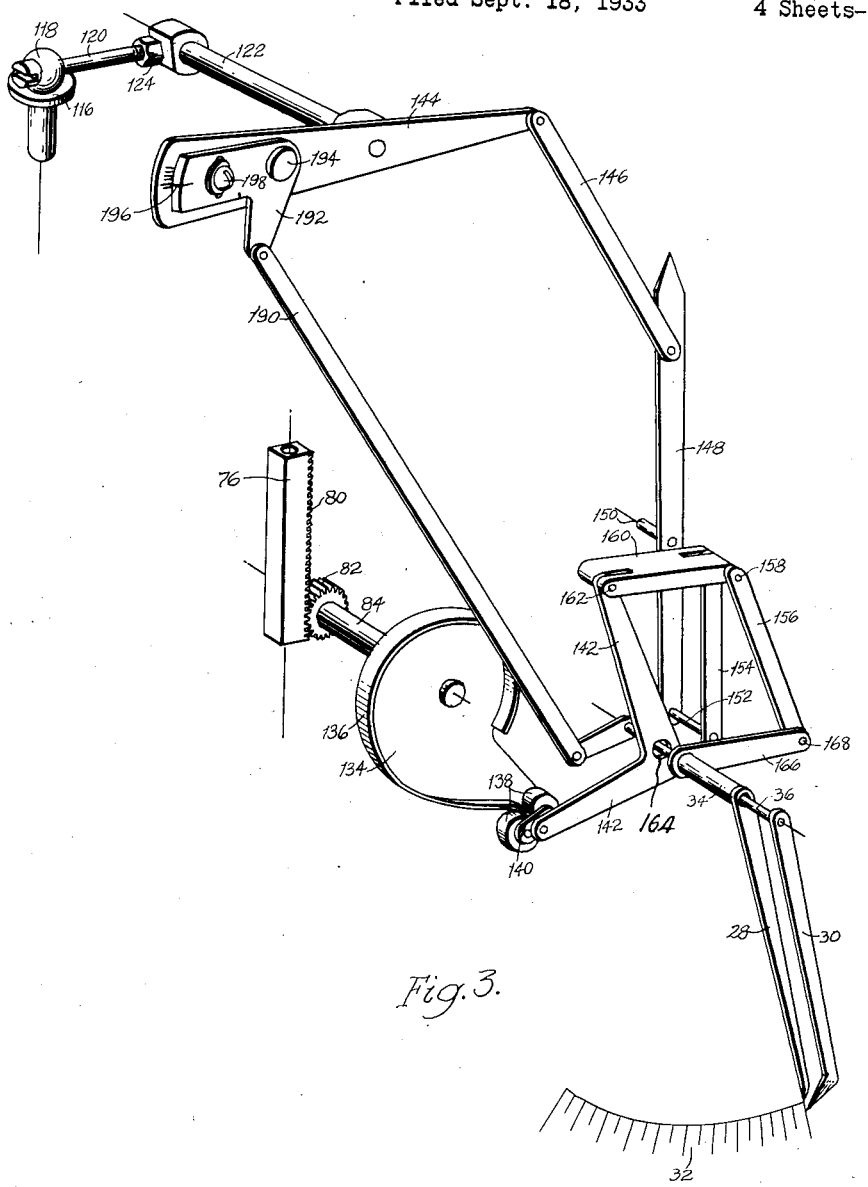
Figure 3 is a perspective view of the operating mechanism by which the two quantities are multiplied and indicated, but showing as indicators (instead of pens) two pointers moving over suitable scales.

The illustrated meter is intended to measure the flow of gas or steam or other fluid through a pipe 10 or the like which is provided with the usual orifice device 12 defining a high pressure on one side and a low pressure on the other side, whose differential is proportional to the square of the flow. The high pressure side is shown connected to the meter by a pipe 14 and the low pressure side by a pipe 16. The meter itself is housed in a suitable casing 18 which may be supported on any desired type of standard 20. The casing 18 may be made in a number of pieces which are bolted or otherwise secured together, as shown in Figure 2, to facilitate the assembly.

Figure 5:
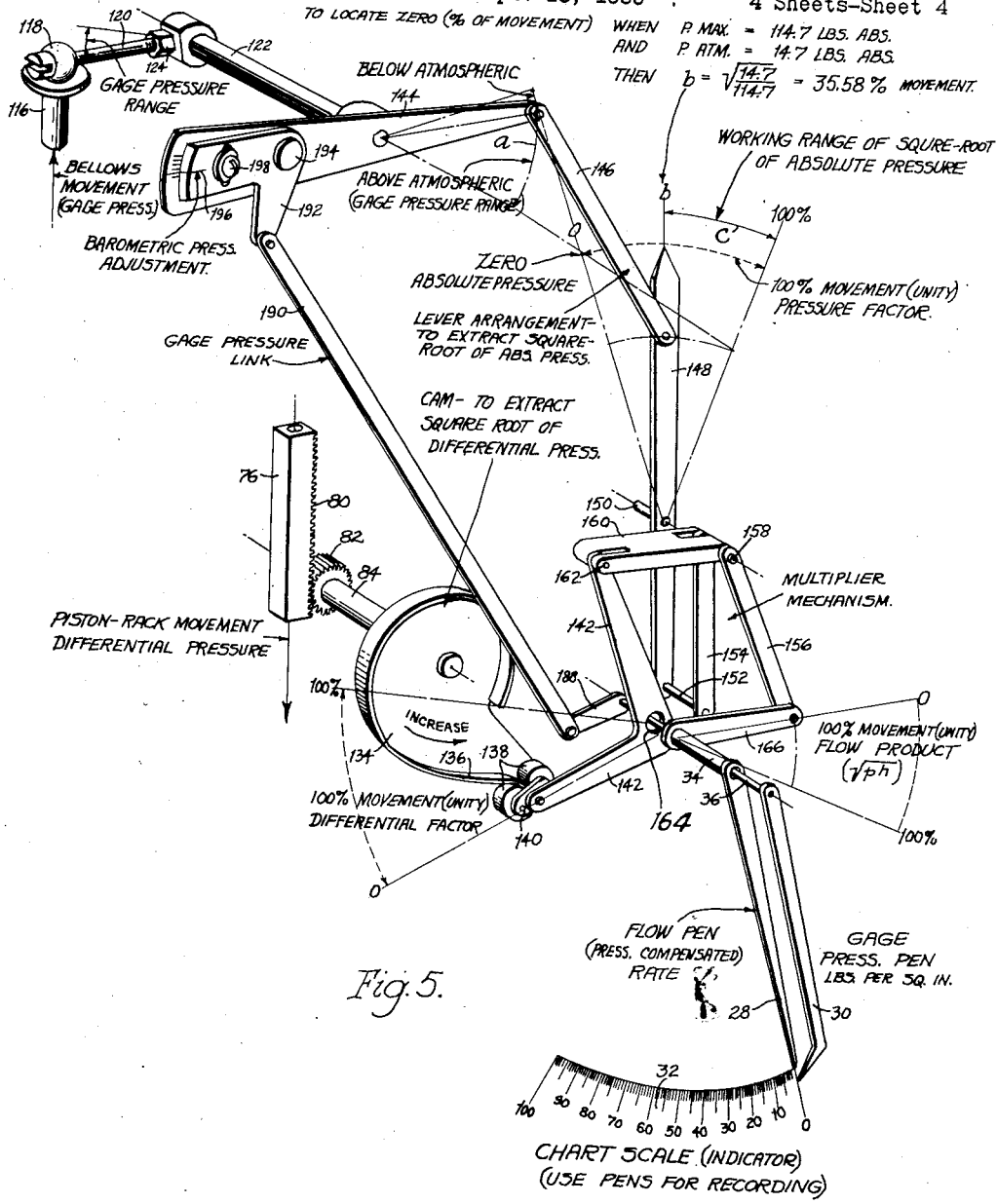
Figure 5 is a diagrammatic perspective view of the parts shown in Figure 3, with various indicia added to facilitate the description of the operation.

In the arrangement shown in Figure 1 the indicators of the mechanism comprise a pair of pens 22 operating on a circular chart 24 driven by the usual clock mechanism, the pens being mounted at their lower ends on co-axially arranged shafts as described below. This figure also shows a totalizing device 26 which in itself forms no part of the present invention. In the arrangement of Figures 3 and 5 the indicators are in the form of pointers 28 and 30 cooperating with a suitable scale 32 and mounted respectively on co-axially arranged shafts 34 and 36, in the same manner as the pens except that the pointers 28 and 30 are shown extending downwardly from the shafts while the pens 22 extend upwardly therefrom.

The high pressure connection 14 is shown extending into the casing 18 through a passage 38 adjustably controlled by a needle valve 40. The passage 38 communicates by a passage 42 below the needle valve with an upper portion 44 of a space containing a pressure-measuring liquid such as mercury or the like 46.

The bottom of the space 44 communicates by a passage 48 with another space 50 which communicates through a passage 52 with the low pressure pipe 16. This forms in effect a manometer measuring the differential in pressure on the opposite sides of the orifice 12, by moving up and down a float 54. In order to provide a direct connection between the spaces 44 and 50 in calibrating the instrument, there is a pipe connection at the back of the instrument which can be opened and closed by manipulating a valve 56. In the normal operation of the meter the valve 56 is closed and there is no direct connection between the spaces 44 and 50.

The float 54 is shown provided with openings by means of which it is guided on two posts 58 suitably secured in the upper portion of the casing 18 and extending downwardly into the space 44. As a safety measure, these posts carry at their lower end a shut-off valve 60 which is normally held away from the passage 48 by its buoyancy but which is forced downwardly to close the passage 48 when the float 54 reaches the lower ends of the posts 58. The lower ends of the posts 58 are reduced in diameter to limit the upward movement of the shut-off valve 60. The passage 38 is shown with a suitable removable drain plug 62.

The passage 38 also communicates through an upwardly extending passage 64 with a cylinder 66 forming part of a fluid-pressure operated motor which operates a part of the meter mechanism, under the control of the float 54 but by means of power derived from the pressure of the fluid entering through the passage 38.

The motor, in the arrangement illustrated, preferably has in the upper part of the casing a differential piston device 68 including a relatively large upper piston 70 movable in the cylinder 66 and a smaller piston 72 movable in a lower co-axial smaller cylinder 74. The pistons 70 and 72 are connected by a suitable rigid skeleton framework or the like, so that the space between them is all at the same pressure.

The lower part of the cylinder 74, below the smaller piston 72, and the upper part of the cylinder 66, above the larger piston 70, communicate with any suitable source of pressure which is different from the pressure in the space between the two pistons and which may conveniently be the atmosphere. In the case of communication with the atmosphere, this is accomplished by forming the casing with suitable small openings therethrough (not shown). Since the upper piston 70 is larger than the lower piston 72 it follows that there would be an upward pressure on the entire piston device 68 if the pressure between the two pistons is greater than the pressure below the lower piston and above the upper piston (i. e. the atmospheric pressure). Conversely if the pressure between the two pistons is less than the pressure above the upper piston and below the lower piston there will be a force acting downwardly on the piston device 68.

The piston device 68 has a downwardly-extending sleeve 76 engaged by a guide roller 78 and formed with a rack 80 meshing with and operating a pinion 82 on an operating shaft 84 which, as more fully explained below, operates under the control of the float 54 to actuate the mechanism corresponding to the differential between the high and low pressures.

The sleeve 76 may be provided if desired with a suitable seal or gland held by a packing nut 86 and slidably embracing a tube 88 in a manner permitting the stem 76 to slide up and down over the tube 88 while maintaining a substantially sealed connection therewith. The tube 88 is shown mounted in a plug 90 screwed into a wall at the top of space 44, so that the interior of the tube 88 is cut off from communication with the cylinder 74.

The float 54 is provided with an upwardly-extending valve rod or stem 92 which extends through the tube 88 and through the sleeve 76 and which is arranged to operate the control valve mechanism shown in detail in Figure 6.

This valve mechanism is carried by a plug 94 forming a part of the piston device 68, and which has a passage 96 leading to the space above the piston and which is controlled by a double ended balanced valve 98 in line with and actuated by the valve stem or rod 92. When the float 54 drops so that the rod 92 leaves the valve 98, the valve 98 also drops opening communication through the passage 96 and the passages 100 and 102 controlled by the valve 98, so that the high pressure fluid between the two pistons can escape upwardly and the pressure will correspondingly become reduced. When the float 54 rises or when the piston device 68 moves downwardly, the upper end of the rod or valve stem 92 contacts the double valve 98 to close or at least to reduce the opening of the passages 100 and 102, and thereby to shut off or reduce the leakage of the high pressure fluid from the space between the pistons to the atmosphere.

In practice there is a variably-controlled substantially constant leakage of the high pressure fluid to the atmosphere, under the control of valve 98 or its equivalent, such that the piston device 68 accurately and powerfully follows the movements of the float 54 without imposing any load on the float which would interfere with its movement. Since the movement of the piston device 68 operates the shaft 84 it will be seen that the movements of the shaft 84 are accurately controlled by the movements of the float 54 although the shaft is actually rotated by power, so that it can exert a considerable force if necessary to overcome friction or other retarding forces in the mechanism described below.

The space 50, that is in communication with the low pressure pipe 16, communicates through a baffle 104 or the like with a space 106 containing an expansible and contractible metallic bellows 108. The baffle 104 tends to prevent any liquid entrained in the fluid entering at 52 from entering the space 106. The baffle 104, or the bottom of bellows 108, may if desired have small projections preventing the bellows from sealing the space 106 from the space 50. The bellows 108 is compressed more or less by the fluid pressure against the resistance of a spring 110 which is arranged therein, thereby to force upwardly a thrust rod 112 acting on a plunger 114 which has at its upper end an adjustable headed thrust set-screw 116. The flat top of the member 116 acts on a rounded portion 118 of an operating lever 120 which is connected to and which operates a shaft 122. The lever 120 can be adjusted as to its effective length, it being threaded into an opening in the shaft 122 and locked in any desired adjusted position by means such as a lock nut 124. It will be observed that the movements of the shaft 122 correspond accurately to the pressures in the space 50.

The space 50 may be provided with a shut-off valve 126 having a guide or stem 128 and which is normally held away from its seat by its buoyancy in the mercury but which drops to close the passage 48 when the mercury is drained out.

The upper position of the piston device 68, and therefore one limit of movement of the shaft 84, may be adjustably determined by means such as a set screw 130 passing through a gland or the like 132 at the top of the instrument. The stop 130 also permits limiting the movement of the square-root cam, to prevent it from approaching too close to its zero position to operate easily.

It will be seen that in the angular movements of the shafts 84 and 122 respectively we have quantities corresponding to the differential in pressures on opposite sides of the orifice 12 and to the fluid pressure on one side of that orifice. The square roots of these quantities, and therefore the square roots of the angular movements of the shafts 84 and 122 are the quantities which it is desired to combine to obtain a corrected reading of the fluid flow.

The shaft 84 has mounted thereon a novel square root cam 134, shown formed as a metal stamping having an edge flange 136 whose curvature with respect to the axis of the shaft 84 corresponds to the various angular positions of the shaft 84. As these quantities at one end of the scale change more rapidly than it is feasible to simulate by an ordinary cam and roller type of engagement, we preferably provide the flange at this end with a relatively sharp bend, and the flange is embraced by two rollers or followers 138 mounted on opposite ends of an equalizer bar or the like 140 which is centrally pivoted on the end of a bell crank lever 142.

It will be seen that the initial movement of the cam 134 gives a very rapid movement of the lever 142 as the equalizer bar 140 is swung about its pivot at the same time that the rollers follow the cam flange 136. This enables a more accurate movement of the lever 142 at this end of the scale of the square root cam, so that the angular movements of the bell crank lever 142 are accurately proportional to the square root of the differential in pressures on opposite sides of the orifice 12.

The shaft 122 is provided with a lever 144 centrally mounted thereon and which is connected, as more fully explained below, by a link 146 arranged at such an angle as to operate a second lever 148 substantially in proportion to the square root of the movement of the arm 120 and therefore of the absolute pressure of the fluid in the pipe 10.

The lever 148 is fulcrumed approximately at its center on a fixed pivot 150 and has its lower end connected by a floating pivot 152 with a floating link 154. The link 154 is equal in length to the vertical portion of the bell crank lever 142 and is also equal in length to a second floating link 156 which forms one side of a parallelogram motion mechanism of which the vertical arm of the lever 142 forms the other side. The link 154, the vertical portion of the bell crank lever 142 and the lower portion of the lever 148 are equal in length to the distance between the pivot 150 and the fixed axis on which the lever 142 is pivoted.

The upper ends of the two links 154 and 156 are connected by a floating pivot 158 to a floating link 160 which is connected by means such as another floating pivot 162 to the upper end of the lever 142. The lever 142 is mounted on a suitable fixed pivot which is not shown in Figures 3 and 5, from which figures it is omitted for the sake of showing the position of the indicator shaft 36 which is journalled inside of this fixed pivot. However, the opening 164 in the lever 142 which is journalled on this fixed pivot is shown in these figures and indicates its position.

The indicator sleeve 34 has rigidly connected thereto an indicator arm 166 which is the same length as the floating link 160 and which is connected by means such as a pivot 168 to the lower end of the link 156.

It will be seen that the lever 142 and the indicator arm 166, as well as the two indicators 28 and 30 (or the pens 22) all move about the same axis which is indicated in Figures 3 and 5 as the axis of the shaft 36. The axis of the pivot 158, when all of the parts are in their zero positions, coincides with the axis of the shaft 150 on which the lever 148 is pivoted. When all of the parts are in their zero positions, the axis of the floating pivot 152 coincides with the axis of the pivot 168, so that the lower portion of the lever 148 and the two links 154 and 156 are all arranged one behind the other.

So long as the lever 142 remains in its zero position, movement of the lever 148 merely swings the link 154 idly about the axis of the pivot 150 and the pivot 158, which at that time are in line with each other. Therefore the indicator 28 does not move so long as the lever 142 remains in its zero position. Similarly, if the lever 148 remains in its zero position, movement of the lever 142 merely moves the parallelogram 142—160—156—166 idly back and forth without changing the angular position of the arm 166 and therefore without moving the indicator 28. Since the true zero position of lever 148 corresponds to a vacuum, without any pressure from the atmosphere, this condition is never met with in practice, and any movement of lever 142 always (as a practical matter) does operate pointer 28.

If, however, the lever 142 is moved clockwise to its 100% position, and the lever 148 is also moved clockwise to its 100% position, the result will be to swing the parallelogram 160—156—166 downwardly to move the indicator 28 to its 100% position on its scale 32. An analysis of the mechanism will show that at intermediate positions of the two levers 142 and 148 the indicator 28 will be moved along uniform graduations on the scale 32 to a position which corresponds to the product of the two quantities represented by the movements of the two levers 142 and 148 respectively. That is, the indicator 28 indicates on its scale 32 the product of the two square roots and therefore the desired corrected reading.

The above described novel parallelogram linkage with its parts arranged to perform the operation of mechanical multiplication of two quantities, aside from its combination with the other parts as described herein, is the joint invention of Albert F. Spitzglass and Otto T. Handwerk and is more fully explained and is claimed in our copending application No. 687,064, filed August 28, 1933.

As explained below the movements of the lever 144 are proportional to the absolute pressure of the fluid in the conduit 10. Ordinarily it is desirable to have the indicator 30 show, not this absolute pressure, but the pressure in excess of the atmospheric pressure (that is normally approximately 14.7 lbs. per sq. in. less than the absolute pressure). For convenience in describing the manner of obtaining this correction, and certain features of the other parts of the mechanism, we have shown in Figure 4 the same general arrangement of parts as in Figure 3 but with scales provided for them to show their manner of movement and in some cases with pointers and the like added to show the movement of the parts relatively to these scales. It will be appreciated that ordinarily these scales and pointers are not used in the actual meter, as the only parts which have to be graduated for ordinary use are the scales on the chart which cooperate with the indicators 22 or 28 and 30.

Figure 4:
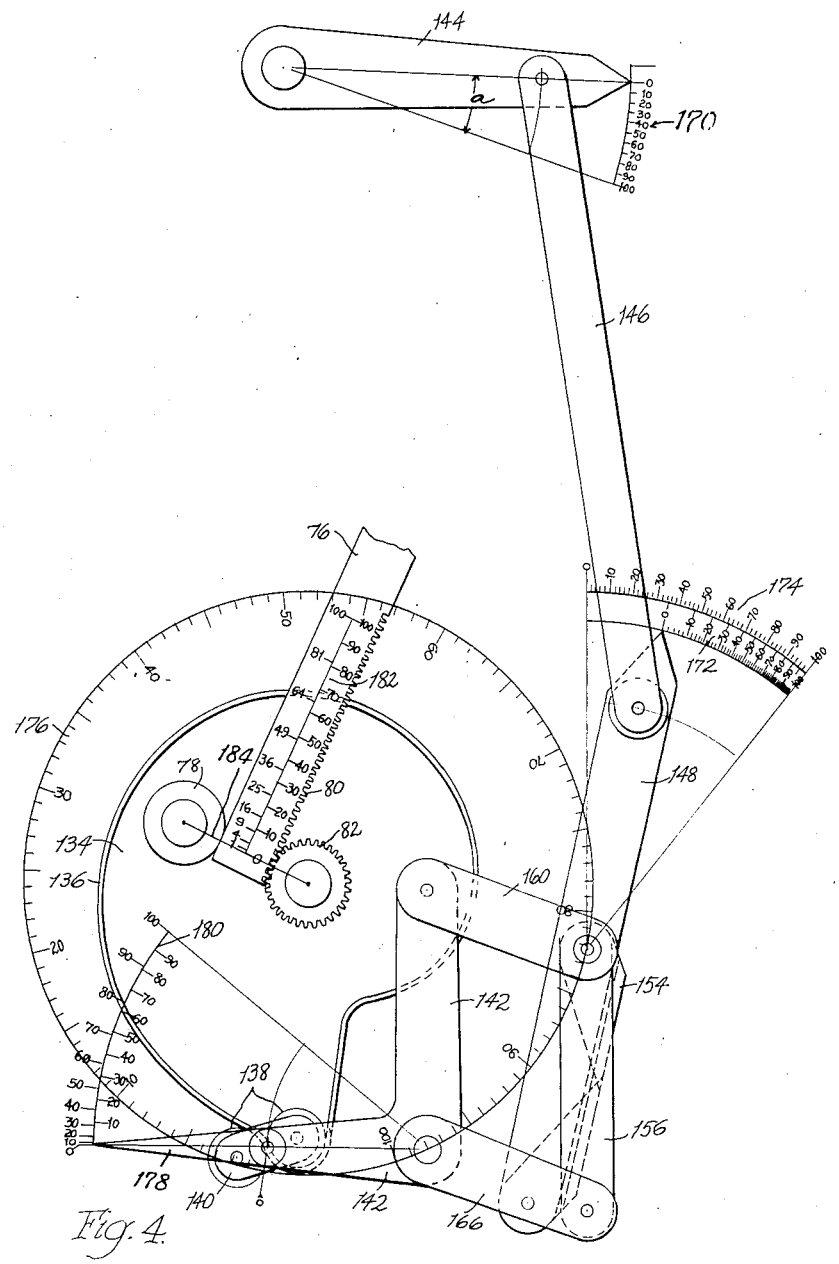
Figure 4 is a view corresponding to part of Figure 3, but with a number of the movable parts provided with scales, to facilitate the description of their operation.

In this Figure 4, for convenience in this description as explained, the lever 144 is shown as terminating in a pointer indicating a reading on scale 170, the maximum limits of which are shown as the angle "a" in the diagram of Figure 5. Scale 170 shows the arm moving to indicate pressures from 0 to 100%; the 100% indicates whatever is the maximum for which the meter is adapted. The link 146, during the movement of lever 144 from zero to 100%, moves the upper end of the lever 148 from zero to 100% along a scale 172 which represents the fluid pressure with the atmospheric pressure regarded as zero.

It will be noted that this scale is not uniformly graduated because of the fact that the angle of the link 146 is so selected as to give uniform readings on a second scale 174 which represents the square root of the absolute pressure. It will be seen that the lower limit of the lever 148, which is at zero on the scale 172, is at atmospheric pressure on the scale 174. The scale 172 may be regarded as giving the working range of the instrument corresponding to the angle "c" in Figure 5, since the lever 148 never moves below the point on the scale 174 which indicates atmospheric pressure. At the same time it is necessary to design the instrument to have this theoretical movement of the lever 148 through the angle "b", or along the entire range of the scale 174, because of the fact that the corrections of the flow readings which it is desired to secure are not proportional to the pressure above atmospheric pressure but to the absolute pressure.

The square root cam 134 is also shown in Figure 4 provided with a scale 176 which indicates the square root factor throughout the greater part of the range of movement of the cam, and the equalizer bar 140 carrying the cam rollers 138 is shown provided with a pointer 178 movable along an auxiliary scale 180 shown graduated on one side as a percent of the movement and graduated on the other side to show the square root factor. This figure also shows the rack member 76 provided with a scale 182 cooperating with an indicating pointer 184 to show the reading of the differential pressure which actuates the square root cam 134.

It is desirable to show by means of the indicator 30 or the corresponding pen 22 the usual gage pressure referring to atmospheric pressure as zero. For this reason the shaft 36 which carries the indicator 30 is provided with an operating arm 188 connected by an inclined link 190 to a bell crank lever 192 pivoted at 194 on the left end of the lever 144. The lever 192 is movable with respect to the lever 144 to correct for changes in atmospheric pressure, due to barometric changes or to changes in altitude, as shown for example on a scale 196, and is adapted to be clamped in adjusted position by means such as a clamp screw 198 which passes through a slot in the lever 192.

The angles of the levers 188 and 192 and of the link 190 are such that the indicator 30 has the desired movement along the scale 32. If desired the scale 32 could be graduated in two different manners, but we prefer to proportion and arrange the various parts so that the two indicators can cooperate with a single scale.

While one illustrative embodiment of the invention has been described in detail, it is not our intention to limit its scope to that particular embodiment, or otherwise than by the terms of the appended claims.

We claim:

1. A meter comprising an indicator having a shaft, an arm rigid with said shaft, a floating link of the same length as and arranged parallel to said arm, a lever fulcrumed for movement about the axis of said shaft and connected to one end of said floating link, a second link of the same length as said lever and parallel thereto and having connections at its ends to the end of said arm and to the other end of said floating link, a lever having a fulcrum behind and in line with the connection between the floating link and the second link in one extreme position of said connection and having a portion below said fulcrum equal in length to and arranged behind said second link and the end of which is linked to the connection between the floating link and the second link, a pressure-operated member, a square-root-extracting device connecting said member to the first lever, a second pressure-operated member, and a square-root-extracting device connecting said second member to the second lever.

2. A meter comprising, in combination with a mechanical multiplying mechanism which consists of four members connected by pivots at their ends to form a parallelogram linkage with one of the pivots fixed and having a fifth member connected to the pivot diagonally opposite the fixed pivot and a sixth member pivoted at one end to the free end of the fifth member and fulcrumed on a second fixed pivot spaced from the first fixed pivot, an indicator secured to and movable with one of the members mounted on the first fixed pivot, a pressure-operated device having a square-root-extracting mechanism connecting it to the other member mounted on the first fixed pivot, a second pressure-operated device, and a second square-root-extracting device connecting said second pressure-operated device to said sixth member.

3. A meter comprising, in combination with a multiplying mechanism consisting of two spaced pivots having mounted thereon two arms equal in effective length to the distance between said pivots and one of which has pivoted at its free end a third arm of the same length and a link connecting the free ends of said third arm and the other of the said two arms, two devices controlled independently in accordance with measurements of conditions to be indicated by the meter, means connecting said devices respectively to the first two arms to operate them, an indicator, a fourth arm of the same length as said first named link connected to said indicator, and a link of the same length as said first three arms operatively connected to the junction of said first named link and said third arm and to said fourth arm thereby to operate the indicator to show a function of the product of the said measurements.

4. A meter comprising, in combination with a multiplying mechanism consisting of two spaced pivots having mounted thereon two arms equal in effective length to the distance between said pivots and one of which has pivoted at its free end a third arm of the same length and a link connecting the free ends of said third arm and the other of the said two arms, pressure-operated devices, means connecting said devices respectively to the first two arms to operate them, an indicator, a fourth arm of the same length as said first named link connected to said indicator, and a link of the same length as said first three arms operatively connected to the junction of said first named link and said third arm and to said fourth arm thereby to operate the indicator to show a function of the product of the measurements controlling said devices.

ALBERT F. SPITZGLASS.
OTTO T. HANDWERK.